(12) United States Patent
Bouchat et al.

(10) Patent No.: US 8,155,132 B2
(45) Date of Patent: Apr. 10, 2012

(54) METHOD FOR SETTING UP A CONNECTION

(75) Inventors: Christele Bouchat, Antwerpen (BE); Nico Alfred Anna Janssens, Overmere (BE); Sven Maurice Joseph Ooghe, Ghent (BE); Erwin Alfons Constant Six, Kalken (BE)

(73) Assignee: Alcatel Lucent, Paris (FR)

( * ) Notice: Subject to any disclaimer, the term of this patent is extended or adjusted under 35 U.S.C. 154(b) by 2122 days.

(21) Appl. No.: 10/890,271

(22) Filed: Jul. 14, 2004

(65) Prior Publication Data

US 2005/0013301 A1 Jan. 20, 2005

(30) Foreign Application Priority Data

Jul. 14, 2003 (EP) .................................. 03291740

(51) Int. Cl.
*H04L 12/28* (2006.01)
(52) U.S. Cl. ........................................ 370/409; 370/389
(58) Field of Classification Search .................. 370/412, 370/420, 258, 418, 230, 395, 252, 401, 389, 370/352, 397, 236.1; 713/201; 709/219, 709/220
See application file for complete search history.

(56) References Cited

U.S. PATENT DOCUMENTS

| | | | |
|---|---|---|---|
| 6,301,229 B1 | 10/2001 | Araujo et al. | |
| 6,370,147 B1 | 4/2002 | Beser | |
| 6,424,657 B1 * | 7/2002 | Voit et al. | 370/412 |
| 6,977,922 B2 * | 12/2005 | Blanset et al. | 370/352 |
| 7,079,540 B1 * | 7/2006 | Wilson et al. | 370/395.3 |
| 2002/0016831 A1 * | 2/2002 | Peled et al. | 709/219 |
| 2002/0176427 A1 * | 11/2002 | Noda et al. | 370/401 |
| 2003/0061321 A1 * | 3/2003 | Roh | 709/222 |
| 2003/0081614 A1 * | 5/2003 | Sukegawa et al. | 370/395.42 |
| 2003/0101243 A1 * | 5/2003 | Donahue et al. | 709/220 |
| 2003/0204744 A1 * | 10/2003 | Maltais et al. | 713/201 |
| 2004/0090970 A1 * | 5/2004 | Sanchez et al. | 370/397 |
| 2004/0105444 A1 * | 6/2004 | Korotin et al. | 370/395.5 |
| 2004/0165592 A1 * | 8/2004 | Chen et al. | 370/395.1 |
| 2006/0274668 A1 * | 12/2006 | Franklin et al. | 370/252 |

FOREIGN PATENT DOCUMENTS

WO WO 02/077808 A 10/2002

* cited by examiner

*Primary Examiner* — Kwang B Yao
*Assistant Examiner* — Syed M Bokhari
(74) *Attorney, Agent, or Firm* — Sughrue Mion, PLLC

(57) ABSTRACT

In methods for setting up communications between digital-subscriber-line terminal modems (13) and internet-service-providers (30) via digital-subscriber-line-access-multiplexers (2,20) and forwarders (3) of asynchronous-transfer-mode-networks (1) further comprising dynamic-host-configuration-protocol-relay-agents (4,40), first messages are sent from the terminal modems (13) to the agents (4,40) via the access multiplexers (2,20), which first messages comprise incoming logical identifiers defining couplings (14) between the terminal modems (13) and the access multiplexers (2,20), second messages are sent from the agents (4,40) to dynamic-host-configuration-protocol-servers (5) for receiving internet-protocol-addresses to be supplied to the terminal modems (13) via the agents (4,40). To be able to locate the agents (4,40) outside the forwarders (3), the agents (4,40) convert the first messages into the second messages at least by inserting outgoing logical identifiers defining couplings (6) between the access multiplexers (2,20) and the forwarders (3), and the forwarders (3) are informed about relationships between the Internet-Protocol-addresses and the outgoing logical identifiers. The forwarders (3) then have sufficient knowlegde to find the right (part of the) access multiplexer (2,20).

17 Claims, 2 Drawing Sheets

METHOD FOR SETTING UP A CONNECTION

The invention relates to a method for setting up a communication between a terminal modem and an internet-service-provider via an access multiplexer and a forwarder of an access network further comprising an agent, with a coupling between the terminal modem and the access multiplexer being defined by an incoming logical identifier and with a coupling between the access multiplexer and the forwarder being defined by an outgoing logical identifier, which method comprises the steps of sending a first message from the terminal modem to the agent via the access multiplexer, which first message comprises the incoming logical identifier; and sending a second message from the agent to a server for receiving an internet-protocol-address to be supplied to the terminal modem via the agent.

The terminal modem for example is a modem coupled to one or more terminals, and the forwarder for example is an internet-protocol-forwarder, like a part of a broadband access server. The access multiplexer gives many terminal modems (like for example asymmetrical digital subscriber line modems etc.) and many terminals (like for example personal computers for high speed internet sessions and internet protocol phones for calls etc.) access to the access network.

According to a prior art method, the agent forms part of the forwarder. The first message is sent from the terminal modem via the access multiplexer to the agent, and the second message is sent from the agent to a server for example also forming part of the access network. This server either has a list of available internet-protocol-addresses, or retrieves a available internet-protocol-address from the internet-service-provider.

The known method is disadvantageous, inter alia, due to being based upon an access network in which the agent forms part of the forwarder. This is relatively unflexible. As soon as the agent is located elsewhere in the access network, the forwarder no longer has sufficient knowledge to find the right (part of the) access multiplexer. In other words, the forwarder does not know the relationship between the internet-protocol-address used for data traffic exchanged with the terminal modem and the logical interface via which this data traffic is exchanged with the terminal modem. The reason for this is that firstly there are many access multiplexers coupled to the same forwarder, and secondly the first message comprises the incoming logical identifier, which defines the coupling between the terminal modem and the access multiplexer only. The incoming logical identifier does not give the forwarder sufficient knowledge to find the right (part of the) access multiplexer, due to this incoming logical identifier not defining a coupling inside the access network.

It is an object of the invention, inter alia, of providing a method for setting up a communication via an access multiplexer in which the agent does not form part of the forwarder.

The method according to the invention is characterised in that the method comprises the steps of converting the first message into the second message at least by inserting the outgoing logical identifier;

informing the forwarder about the Internet-Protocol-address and the outgoing logical identifier.

By letting the agent convert the first message into the second message at least by inserting the outgoing logical identifier, and by letting the agent or the server inform the forwarder about the Internet-Protocol-address and the outgoing logical identifier, the forwarder now has sufficient knowlegde to find the right (part of the) access multiplexer, due to the outgoing logical identifier defining the coupling from the forwarder to the access multiplexer inside the access network.

Contrary to prior art solutions, in which the agent formed part of the forwarder in the form of the broadband access server, which is based upon the point-to-point-protocol and which must unpack information before the unpacked information can be forwarded, according to the invention more advanced protocols can be used, and the unpacking is avoided. Further, another location of the agent provides more flexibility.

The invention is however not limited to agents being located outside the forwarder. Independently of the location of the agent, in case of different channels being used between the terminal modem and the access multiplexer for setting up the communication and for the communication itself, it will also be required to convert the first message into the second message at least by inserting the outgoing logical identifier of the logical connection used for the communication itself, instead of inserting the incoming logical connection (identifying the logical connection used for setting up the communication), to avoid problems in the access network. This will still hold, even in case of the agent being positioned in the forwarder.

A first embodiment of the method according to the invention is defined by claim 2. By letting the agent receive the third message and by letting the agent remove the outgoing logical identifier and possible incoming or outgoing physical identifiers from the third message, the internet-protocol-address is sent to the terminal modem via the access multiplexer in an efficient way.

A second embodiment of the method according to the invention is defined by claim 3. By using a server in the form of a dynamic host configuration protocol (DHCP) server, in which case the agent may be a dynamic host configuration protocol relay agent, the more advanced and more efficient dynamic host configuration protocol is used.

A third embodiment of the method according to the invention is defined by claim 4. By using a digital subscriber line (DSL) terminal modem, with the access multiplexer being a digital subscriber line access multiplexer, high speed internet access and parallel internet access and calls/faxes have become possible.

A fourth embodiment of the method according to the invention is defined by claim 5. By using an access network in the form of an asynchronous transfer mode (ATM) network, with the outgoing logical identifier comprising a virtual path identifier and a virtual circuit identifier, more flexibility is provided.

A fifth embodiment of the method according to the invention is defined by claim 6. By making the agent part of the access multiplexer, one large prior art agent forming part of the forwarder has been cut into smaller agents located in the access multiplexers. These smaller agents are able to work simultaneously and will be more efficient. Or, in case of the access network comprising several agents, by making several agents part of several access multiplexers, the access network has become more efficient.

The invention further relates to an agent for setting up a communication between a terminal modem and an internet-service-provider via an access multiplexer and a forwarder of an access network further comprising the agent, with a coupling between the terminal modem and the access multiplexer being defined by an incoming logical identifier and with a coupling between the access multiplexer and the forwarder being defined by an outgoing logical identifier, which agent comprises a receiver for receiving a first message from the terminal modem via the access multiplexer, which first message comprises the incoming logical identifier; and a sender for sending a second message from the agent to a server for receiving an internet-protocol-address to be supplied to the terminal modem via the agent.

The agent according to the invention is characterised in that the agent comprises a converter for converting the first message into the second message at least by inserting the outgoing logical identifier;

wherein the forwarder is informed about the Internet-Protocol-address and the outgoing logical identifier.

The invention yet further relates to a processor program product for setting up a communication between a terminal modem and an internet-service-provider via an access multiplexer and a forwarder of an access network further comprising the processor program product, with a coupling between the terminal modem and the access multiplexer being defined by an incoming logical identifier and with a coupling between the access multiplexer and the forwarder being defined by an outgoing logical identifier, which processor program product comprises a receiving function for receiving a first message from the terminal modem via the access multiplexer, which first message comprises the incoming logical identifier; and a sending function for sending a second message from the processor program product to a server for receiving an internet-protocol-address to be supplied to the terminal modem via the processor program product.

The processor program product according to the invention is characterised in that the processor program product comprises a converting function for converting the first message into the second message at least by inserting the outgoing logical identifier;

wherein the forwarder is informed about the Internet-Protocol-address and the outgoing logical identifier.

The invention also relates to an access multiplexer comprising an agent for setting up a communication between a terminal modem and an internet-service-provider via an access multiplexer and a forwarder of an access network further comprising the agent, with a coupling between the terminal modem and the access multiplexer being defined by an incoming logical identifier and with a coupling between the access multiplexer and the forwarder being defined by an outgoing logical identifier, which agent comprises a receiver for receiving a first message from the terminal modem via the access multiplexer, which first message comprises the incoming logical identifier; and a sender for sending a second message from the agent to a server for receiving an internet-protocol-address to be supplied to the terminal modem via the agent.

The access multiplexer according to the invention is characterised in that the agent comprises a converter for converting the first message into the second message at least by inserting the outgoing logical identifier;

wherein the forwarder is informed about the Internet-Protocol-address and the outgoing logical identifier.

The invention yet also relates to a server for setting up a communication between a terminal modem and an internet-service-provider via an access multiplexer and a forwarder of an access network further comprising an agent, with a coupling between the terminal modem and the access multiplexer being defined by an incoming logical identifier and with a coupling between the access multiplexer and the forwarder being defined by an outgoing logical identifier, which server comprises a receiver for receiving a second message from the agent for receiving an internet-protocol-address destined for the terminal modem, which second message is generated by the agent in response to a reception of a first message from the terminal modem via the access multiplexer, which first message comprises the incoming logical identifier The server according to the invention is characterised in that the server comprises a sender for sending the Internet-Protocol-address to the terminal modem via the agent, which agent has converted the first message into the second message at least by inserting the outgoing logical identifier.

Embodiments of the agent according to the invention and of the processor program product according to the invention and of the access multiplexer according to the invention and of the server according to the invention correspond with the embodiments of the method according to the invention.

The invention is based upon an insight, inter alia, that the forwarder should always have sufficient knowledge to find the right (part of the) access multiplexer, in other words, the forwarder must know the relationship between the internet-protocol-address used for data traffic exchanged with the terminal modem and the logical interface via which this data traffic is exchanged with the terminal modem, and is based upon a basic idea, inter alia, that the agent must convert the first message into the second message at least by inserting the outgoing logical identifier, and that the forwarder should be informed about the Internet-Protocol-address and the outgoing logical identifier.

The invention solves the problem, inter alia, of providing a method for setting up a communication via an access multiplexer in which the agent does not form part of the forwarder, and is advantageous, inter alia, in that more advanced protocols can be used, the unpacking by the forwarder is avoided, and another location of the agent makes the access network less static.

These and other aspects of the invention will be apparent from and elucidated with reference to the embodiments(s) described hereinafter.

Figure 1:
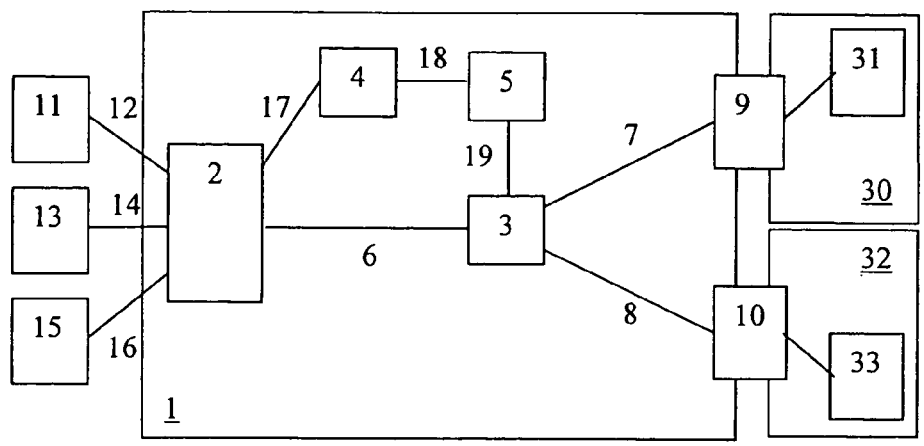
FIG. 1 shows in block diagram form an access network coupled to an internet service provider and to a terminal modem and comprising an access multiplexer, an agent according to the invention, a server according to the invention and a forwarder.

The access network 1 shown in FIG. 1 and coupled to internet service providers 30,32 and to terminal modems 11,13,15 comprises an access multiplexer 2, an agent 4 according to the invention, a server 5 according to the invention and a forwarder 3. Terminal modem 11 (13,15) is coupled via a coupling 12 (14,16) to access multiplexer 2, which is further coupled via a coupling 17 to agent 4 and via a coupling 6 to forwarder 3. Agent 4 is further coupled via a coupling 18 to server 5, which is further coupled via a coupling 19 to forwarder 3. Forwarder 3 is further coupled via a coupling 7 to an edge node 9 and via a coupling 8 to an edge node 10. Edge node 9 is further coupled to a server 31 of internet service provider 30, and edge node 10 is further coupled to a server 33 of internet service provider 32.

Figure 2:
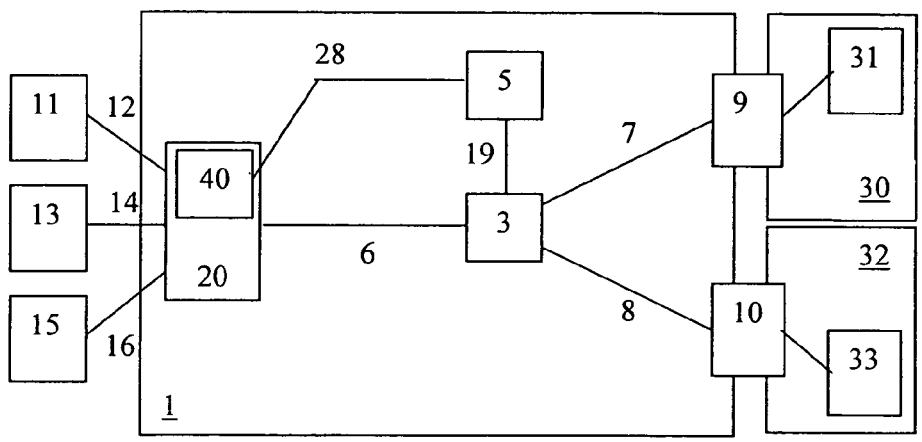
FIG. 2 shows in block diagram form an access network coupled to an internet service provider and to a terminal modem and comprising an access multiplexer according to the invention, a server according to the invention and a forwarder, with the access network according to the invention comprising an agent according to the invention.

The access network 1 shown in FIG. 2 corresponds with the the access network 1 shown in FIG. 1, apart from now comprising, instead of multiplexer 2, an access multiplexer 20 according to the invention, which access multiplexer 20 comprises an agent 40 according to the invention for example at least partly corresponding with agent 4 according to the invention. Access multiplexer 20 is coupled via a coupling 28 to server 5.

Figure 3:
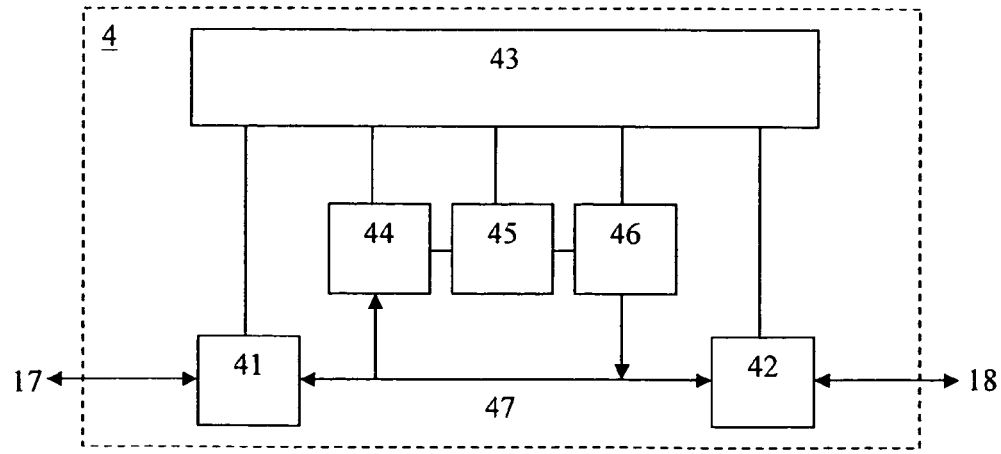
FIG. 3 shows in block diagram form an agent according to the invention.

The agent 4 according to the invention shown in FIG. 3 comprises an access multiplexer interface 41 to be coupled to access multiplexer 2 via coupling 17 and coupled to a server interface 42 via a coupling 47. Coupling 47 is further coupled to a receiver 44 and to a sender 46, which are both coupled to a converter 45. An agent controller 43 is coupled to both interfaces 41,42 and to receiver 44, sender 46 and converter 45 for controlling purposes. Server interface 42 is to be coupled to server 5 via coupling 18.

Figure 4:
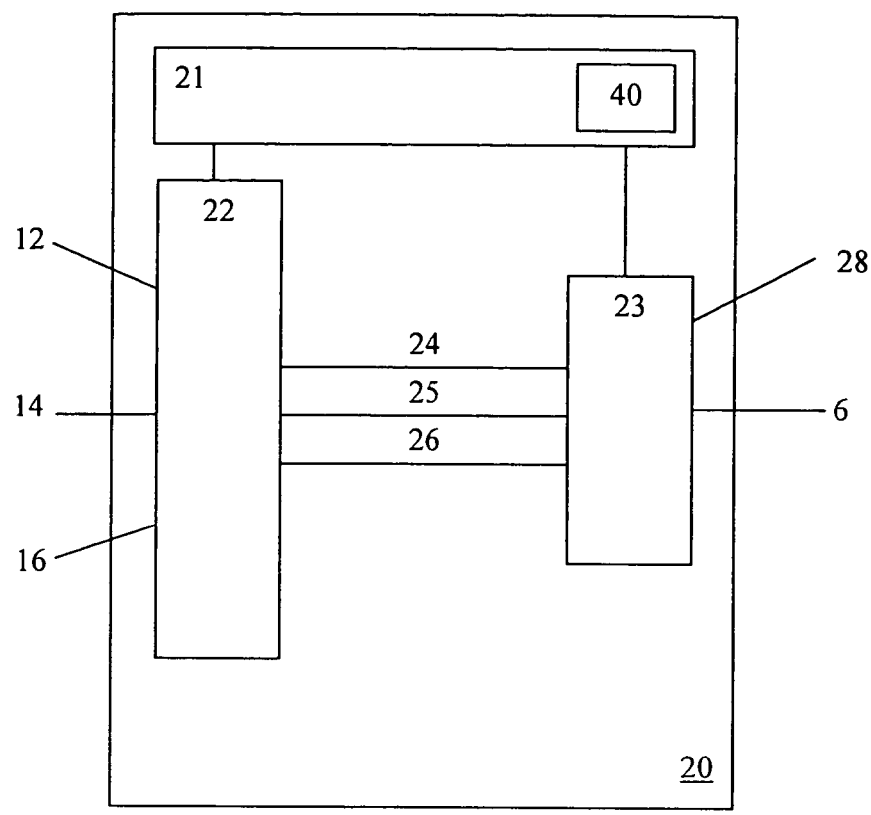
FIG. 4 shows in block diagram form an access multiplexer according to the invention.

The access multiplexer 20 according to the invention shown in FIG. 4 comprises a terminal interface 22 coupled to couplings 12,14,16 and coupled to a network interface 23 via couplings 24,25,26. The access multiplexer 20 further comprises a processor 21 coupled to both interfaces 22,23 for controlling purposes and comprising the agent 40. Network interface 23 is further coupled to coupling 28 to be coupled to server 5 and to coupling 6 to be coupled to forwarder 3.

Figure 5:
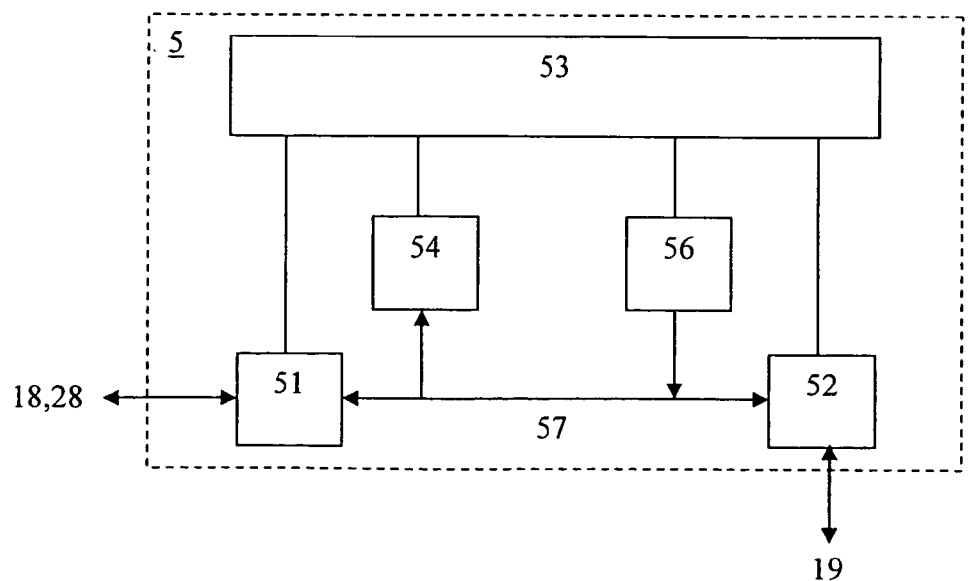
FIG. 5 shows in block diagram form a server according to the invention.

The server 5 according to the invention shown in FIG. 5 comprises an agent interface 51 to be coupled via coupling 18 to agent 4 or via coupling 28 to (agent 40 in) access multiplexer 20 and coupled to a forwarder interface 52 via a coupling 57. Coupling 57 is further coupled to a receiver 54 and to a sender 56. A server controller 53 is coupled to both interfaces 51,52 and to receiver 54 and sender 56 for controlling purposes. Forwarder interface 52 is to be coupled via coupling 19 to forwarder 3.

In case of agent 4 and access multiplexer 2 being separated items (FIG. 1), the invention functions as follows. The coupling 14 between the terminal modem 13 and the access multiplexer 2 is defined by an incoming physical identifier and an incoming logical identifier (the left side of terminal interface 22). The coupling 6 between the access multiplexer 2 and the forwarder 3 is defined by an outgoing physical identifier and an outgoing logical identifier (the right side of network interface 23). Via terminal modem 13 coupled to one or more terminals not shown, a first message is sent from the terminal modem 13 to the agent 4 via the access multiplexer 2, which first message comprises at least the incoming logical identifier. Thereto, access multiplexer 2 is able to detect this first message via for example a detecting function in processor 23 and to, in response to a detection, send it to agent 4 via coupling 17. Agent 4 receives this first message via access multiplexer interface 41 and receiver 44, detects this first message via for example a detecting function in controller 43, converts the first message into the second message via converter 45 at least by inserting the outgoing logical identifier, and sends the second message to the server 5 via sender 46 and server interface 42 and coupling 18.

Server 5 receives this second message via agent interface 51 and receiver 54, and in response to a reception either consults a list for receiving a available internet-protocol-address to be used by terminal modem 13 or for example contacs server 31 via coupling 19, forwarder 3, coupling 7 and edge router 9 for receiving a available internet-protocol-address to be used by terminal modem 13. After having received this available internet-protocol-address to be used by terminal modem 13, server 5 sends a third message comprising the internet-protocol-address and the outgoing logical identifier via sender 55 and agent interface 51 to the agent 4. Agent 4 receives this third message via server interface 42 and receiver 44 and in response to a reception sends the internet-protocol-address via sender 46 and access multiplexer 41 and coupling 17 to access multiplexer 2, which sends the internet-protocol-address to terminal modem 13 via coupling 14.

In the mean time, either server 5 has informed forwarder 3 via coupling 19 about the relationship between the internet-protocol-address and the outgoing logical identifier, or agent 4 has done so via server 5 or via access multiplexer 2 or via a coupling not shown. As a result, a communication between terminal modem 13 and server 31 can take place via forwarder 3, due to forwarder 3 knowing the relationship between the internet-protocol-address used for this communication and the outgoing logical identifier defining coupling 6. In other words, when receiving information from server 31 destined for terminal modem 13 and defined by an internet-protocol-address, the forwarder 3 now knows that this information is to be forwarded to access multiplexer 2.

According to a prior art solutions, the agent formed part of the forwarder. Due to the agent knowing the relationship between the internet-protocol-address used for the communication and the incoming logical identifier, there was no problem. By removing the agent from the forwarder, the forwarder no longer has sufficient knowledge to find the right (part of the) access multiplexer, because the forwarder is usually coupled to more than one access multiplexer. By letting the agent 4 insert the outgoing logical identifier and by informing the forwarder 3 about the relationship between the internet-protocol-address used for the communication and the outgoing logical identifier, the forwarder 3 has got sufficient knowledge to find the right (part of the) access multiplexer 2, due to the outgoing logical identifier defining the coupling 6 from the forwarder 3 to the access multiplexer 2 inside the access network 1.

Contrary to prior art solutions, in which the agent formed part of the forwarder in the form of a broadband access server, which is based upon the point-to-point-protocol and which must unpack information before the unpacked information can be forwarded, according to the invention more advanced protocols can be used, and the unpacking is avoided. Further, another location of the agent provides more flexibility.

The invention is however not limited to agents 4 being located outside the forwarder 3. Independently of the location of the agent 4, in case of different channels being used between the terminal modem 13 and the access multiplexer 2 for setting up the communication and for the communication itself, it will also be required to convert the first message into the second message at least by inserting the outgoing logical identifier of the logical connection used for the communication itself, instead of inserting the incoming logical connection (identifying the logical connection used for setting up the communication), to avoid problems in the access network 1. This will still hold, even in case of the agent being positioned in the forwarder.

The server 5 may be in the form of a dynamic host configuration protocol (DHCP) server, in which case the agent 4 may be a dynamic host configuration protocol relay agent, to use the more advanced and more efficient dynamic host configuration protocol. The terminal modem 13 may be a digital subscriber line (DSL) terminal modem, with the access multiplexer 2 being a digital subscriber line access multiplexer, to make high speed internet access and parallel internet access and calls/faxes possible. The access network 1 may be in the form of an asynchronous transfer mode (ATM) network, with the outgoing logical identifier comprising a virtual path identifier (VPI) and a virtual circuit identifier (VCI), to provide more flexibility. The forwarder 3 may be in the form of an internet-protocol-forwarder.

In case of agent 40 and access multiplexer 20 being integrated items (FIG. 2), the invention functions as described before, apart from the fact that the agent 40 now forms part of the access multiplexer 20, for example due to being integrated in processor 21. In this case, for example access multiplexer interface 41 can be avoided, and server interface 42 can be integrated into network interface 23. By making the agent 40 part of the access multiplexer 20, one large prior art agent forming part of the prior art forwarder has been cut into smaller agents located in the access multiplexers. These smaller agents are able to work simultaneously and will be more efficient. Or, in case of the access network comprising several agents, by making several agents part of several access multiplexers, the access network has become more efficient.

The coupling 6 for example comprises many (permanent virtual) connections, and the couplings 7,8 for example comprise so-called tunnels. The agent 4,40 may be a hardware agent, or may be a software agent in which case in FIG. 3 interfaces 41,42 will be interfacing functions, receiver 44 will be a receiving function, converter 45 will be a converting function, sender 46 will be a sending function, and controller 43 will be a controlling function. The server 5 may be a hardware server, or may be a software server in which case in FIG. 4 interfaces 51,52 will be interfacing functions, receiver 54 will be a receiving function, sender 56 will be a sending function, and controller 53 will be a controlling function. But combinations of hardware parts and software parts are not to be avoided. Server 5 may be integrated into access multiplexer 2,20 or into forwarder 3 or not, and may be able to contact server 31 otherwise via one or more couplings not shown.

In case of access network 1 being an ATM network, for coupling 14 in FIG. 2, for example the VCI=1 and the VPI=2. In access multiplexer 20, the value for the VCI is changed such that VCI=5, for example the value for the VPI remains unchanged. For coupling 6, the value for the VCI remains unchanged, and the value for the VPI can change. For coupling 28, according to the invention, instead of using VCI=1, now VCI=5 is used, and VPI=2 is used. The info goes to server 5, which has knowledge about all the VPI's used in access network 1, and for example knows that, at forwarder 3, VPI=7. Server 5 then configures the forwarder 3 such that the internet-protocol-address (IP address) given to (a terminal attached to) the terminal modem 13 is related to VCI=5 and VPI=7. The relay agent 40 has access to a table defining that for VPI=2 the VCI=1 must be changed into the VCI=5. In case of access network 1 being an Ethernet aggregation network, for coupling 14, a DSL port identifier (in case of Ethernet in the first mile) or a VCI (in case of ATM in the first mile) is translated into a VLAN-identifier, for example a Customer-VLAN value x. The coupling 6 between the access multiplexer 20 and the forwarder 3 is defined by another VLAN-identifier, for example a Provider-VLAN value y. In this case, the value for the Provider-VLAN value does not change inside the access network 1. The server 5 will then configure the forwarder 3 with the following info: the internet-protocol-address (IP address) given to (a terminal attached to) the terminal modem 13, is related to Customer-VLAN having the value x and the Provider-VLAN having the value y.

The expression "for" in for example "for sending", "for converting", "for informing" etc. does not exclude that other functions are performed as well, simultaneously or not. The expressions "X coupled to Y" and "a coupling between X and Y" and "coupling/couples X and Y" etc. do not exclude that an element Z is in between X and Y. The expressions "P comprises Q" and "P comprising Q" etc. do not exclude that an element R is comprises/included as well. The terms "a" and "an" do not exclude the possible presence of one or more pluralities. Embodiments defined by subclaims and/or in the introduction and/or in the description may be combined arbitrarily with and/or may be inserted into independent claims without departing from the scope of this invention.

The invention is based upon an insight, inter alia, that the forwarder should always have sufficient knowledge to find the right (part of the) access multiplexer, in other words, the forwarder must know the relationship between the internet-protocol-address used for data traffic exchanged with the terminal modem and the logical interface via which this data traffic is exchanged with the terminal modem, and is based upon a basic idea, inter alia, that the agent must convert the first message into the second message at least by inserting the outgoing logical identifier, and that the forwarder should be informed about the Internet-Protocol-address and the outgoing logical identifier.

The invention solves the problem, inter alia, of providing a method for setting up a communication via an access multiplexer in which the agent does not form part of the forwarder, and is advantageous, inter alia, in that more advanced protocols can be used, the unpacking by the forwarder is avoided, and another location of the agent makes the access network less static.

The invention claimed is:

1. A method for setting up a communication between a terminal modem and an internet-service-provider via an access multiplexer and a forwarder of an access network comprising an agent, with a coupling between the terminal modem and the access multiplexer being defined by an incoming logical identifier and with a coupling between the access multiplexer and the forwarder being defined by an outgoing logical identifier, which method comprises:
   sending a first message from the terminal modem to the agent via the access multiplexer, which first message comprises the incoming logical identifier;
   converting the first message into a second message at least by inserting the outgoing logical identifier;
   sending the second message from the agent to a server for receiving an internet-protocol-address to be supplied to the terminal modem via the agent;
   obtaining, by the server, the internet-protocol-address, after receiving the second message sent by the agent; and
   informing the forwarder about the Internet-Protocol-address and the outgoing logical identifier.

2. The method as defined in claim 1, further comprising:
   sending a third message comprising the internet-protocol-address and the outgoing logical identifier from the server to the agent; and
   sending the internet-protocol-address from the agent to the terminal modem via the access multiplexer.

3. The method as defined in claim 1, wherein the server is a dynamic host configuration protocol server.

4. The method as defined in claim 1, wherein the terminal modem is a digital subscriber line terminal modem, with the access multiplexer being a digital subscriber line access multiplexer.

5. The method as defined in claim 1, wherein the access network is an asynchronous transfer mode network, with the outgoing logical identifier comprising a virtual path identifier and a virtual circuit identifier.

6. The method as defined in claim 1, wherein the agent forms part of the access multiplexer.

7. An agent for setting up a communication between a terminal modem and an internet-service-provider via an access multiplexer and a forwarder of an access network, with a coupling between the terminal modem and the access multiplexer being defined by an incoming logical identifier and with a coupling between the access multiplexer and the forwarder being defined by an outgoing logical identifier, which agent comprises:
- a receiver for receiving a first message from the terminal modem via the access multiplexer, which first message comprises the incoming logical identifier;
- a converter for converting the first message into a second message at least by inserting the outgoing logical identifier; and
- a sender for sending the second message from the agent to a server for receiving an internet-protocol-address to be supplied to the terminal modem via the agent, wherein the server obtains the internet-protocol-address after receiving the second message sent from the agent, and wherein
- the forwarder is informed about the Internet-Protocol-address and the outgoing logical identifier.

8. A non-transitory computer readable medium encoded with a processor program product for setting up a communication between a terminal modem and an internet-service-provider via an access multiplexer and a forwarder of an access network of the processor program product, with a coupling between the terminal modem and the access multiplexer being defined by an incoming logical identifier and with a coupling between the access multiplexer and the forwarder being defined by an outgoing logical identifier, which when executed by a computer, the processor program product causes the computer to perform functions comprising:
- a receiving function for receiving a first message from the terminal modem via the access multiplexer, which first message comprises the incoming logical identifier;
- a converting function for converting the first message into a second message at least by inserting the outgoing logical identifier; and
- a sending function for sending the second message from the processor program product to a server for receiving an internet-protocol-address to be supplied to the terminal modem via the processor program product, wherein the server obtains the internet-protocol-address after receiving the second message sent from the agent, and wherein
- the forwarder is informed about the Internet-Protocol-address and the outgoing logical identifier.

9. An access multiplexer comprising an agent for setting up a communication between a terminal modem and an internet-service-provider via the access multiplexer and a forwarder of an access network, with a coupling between the terminal modem and the access multiplexer being defined by an incoming logical identifier and with a coupling between the access multiplexer and the forwarder being defined by an outgoing logical identifier, which agent comprises:
- a receiver for receiving a first message from the terminal modem via the access multiplexer, which first message comprises the incoming logical identifier;
- a converter for converting the first message into a second message at least by inserting the outgoing logical identifier; and
- a sender for sending the second message from the agent to a server for receiving an internet-protocol-address to be supplied to the terminal modem via the agent, wherein the server obtains the internet-protocol-address after receiving the second message sent from the agent, and wherein
- the forwarder is informed about the Internet-Protocol-address and the outgoing logical identifier.

10. A server for setting up a communication between a terminal modem and an internet-service-provider via an access multiplexer and a forwarder of an access network comprising an agent, with a coupling between the terminal modem and the access multiplexer being defined by an incoming logical identifier and with a coupling between the access multiplexer and the forwarder being defined by an outgoing logical identifier, which server comprises:
- a receiver for receiving a second message from the agent for receiving an internet-protocol-address destined for the terminal modem, which second message is generated by the agent in response to a reception of a first message from the terminal modem via the access multiplexer, which first message comprises the incoming logical identifier; and
- a sender for sending the internet-protocol-address to the terminal modem via the agent, which agent has converted the first message into the second message at least by inserting the outgoing logical identifier, wherein the internet-protocol-address is obtained by the server after receiving the second message sent from the agent.

11. The method as defined in claim 1, wherein the agent converts the first message into a second message at least by inserting the outgoing logical identifier.

12. The method as defined in claim 1, wherein the forwarder is informed of an addressing of the access multiplexer to which to forward, based on the internet-protocol-address and the outgoing logical identifier.

13. The agent as defined in claim 7, wherein the forwarder is informed of an addressing of the access multiplexer to which to forward, based on the inserted outgoing logical identifier.

14. The non-transitory computer readable medium as defined in claim 8, wherein the forwarder is informed of an addressing of the access multiplexer to which to forward, based on the internet-protocol-address and the outgoing logical identifier.

15. The access multiplexer as defined in claim 9, wherein the agent converts the first message into a second message at least by inserting the outgoing logical identifier.

16. The access multiplexer as defined in claim 9, wherein the forwarder is informed of an addressing of the access multiplexer to which to forward, based on the internet-protocol-address and the outgoing logical identifier.

17. The server as defined in claim 10, wherein the forwarder is informed of an addressing of the access multiplexer to which to forward, based on the internet-protocol-address and the outgoing logical identifier.

* * * * *